US012779799B2

(12) United States Patent
Nemanick et al.

(10) Patent No.: US 12,779,799 B2
(45) Date of Patent: Nov. 3, 2026

(54) SELF STIFFENING SPACE MATERIALS

(71) Applicant: The Aerospace Corporation, El Segundo, CA (US)

(72) Inventors: Eric Joseph Nemanick, Santa Monica, CA (US); Henry Helvajian, Pasadena, CA (US); Alan R. Hopkins, Los Angeles, CA (US); Thomas A. Battista, Ashburn, VA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 733 days.

(21) Appl. No.: 18/319,878

(22) Filed: May 18, 2023

(65) Prior Publication Data

US 2024/0383215 A1 Nov. 21, 2024

(51) Int. Cl.

*C08F 2/46* (2006.01)
*B29C 35/08* (2006.01)
*B29C 71/04* (2006.01)
*C08F 2/50* (2006.01)
*C08G 61/04* (2006.01)
*B29K 105/00* (2006.01)
*B29K 105/24* (2006.01)

(52) U.S. Cl.

CPC .......... *B29C 71/04* (2013.01); *B29C 35/0805* (2013.01); *B29C 2035/0827* (2013.01); *B29K 2105/0002* (2013.01); *B29K 2105/24* (2013.01)

(58) Field of Classification Search

CPC ................ B29C 71/04; B29C 35/0805; B29C 2035/0827; B29K 2105/24; B29K 2105/002

USPC ....... 522/137, 136, 135, 134, 1, 6, 189, 184, 522/71; 520/1

See application file for complete search history.

(56) References Cited

U.S. PATENT DOCUMENTS 4,755,819 A * 7/1988 Bernasconi .......... H01Q 15/163 343/915
10,570,605 B2 2/2020 Bright
10,819,038 B2 10/2020 Taylor et al.
10,906,290 B2 2/2021 Yerazunis et al.
11,155,723 B2 10/2021 Weiss et al.
2018/0281303 A1* 10/2018 Yerazunis ............. B29C 64/118
2022/0044001 A1 2/2022 Abramov

* cited by examiner

*Primary Examiner* — Jessica Whiteley
(74) *Attorney, Agent, or Firm* — LeonardPatel PC

(57) ABSTRACT

A method for stiffening space stiffening material on a structure in space includes deploying a structure located in a payload of a vehicle, wherein the structure is composed of the space stiffening material. The method also includes orienting the space stiffening material towards the ultraviolet (UV) light emanating from the sun in order to increase the strength and rigidity of the space stiffening material.

21 Claims, 8 Drawing Sheets

300

SELF STIFFENING SPACE MATERIALS

FIELD

The present invention relates to space stiffening material, and more particularly, to a material that stiffens post deployment in space with increasing and tailorable stiffness and rigidity in post-deployed structures.

BACKGROUND

Large structures (e.g., antennas, solar sails, habitats, and reflectors) prior to being deployed in space are folded up for stowage in launch vehicle fairings. These structures, when deployed from the launch vehicle, are opened up and held rigid through internal structural elements (booms), guy lines, gas pressure, or rotational forces. Even with these internal structural elements; billowing, flexing, and bending of the structure or material may occur due to the structure material being extrinsically flexible. These structures also may collapse from the single point failure of a structural element.

To resolve this issue, stiffening and dampening solutions may be used. For example, large space based antennas are held in place using guy wires, or using a variety of materials and material thicknesses in the structure, with some being employed to dampen flexing, such as ribs, or large lattices and struts being constructed from ever larger and stiffer structures.

However, stiffening and dampening solutions increase mass and complexity to give the necessary strength to resist deformation under loading. For example, structural elements that add mass also add complexity to deliver with the folding and flexibility that was required for launch storage but hinders the mission. Large unfolding scaffolds need to be able to expand from compact stowage to fit in the launch vehicle fairing, but need to reliably unfold and extend, without adding mass to the launch. Guy wires suffer from tangling and unspooling risks during deployment, often requiring multiple motors to wind out the wires and maintain tension throughout deployment. Unfolding booms or scaffolds have multiple hinges that may fail upon deployment.

Accordingly, an improved self-stiffening space material may be beneficial.

SUMMARY

Certain embodiments of the present invention may provide solutions to the problems and needs in the art that have not yet been fully identified, appreciated, or solved by current stiffening and dampening solutions. For example, some embodiments of the present invention pertain to space stiffening material configured to increase stiffness and rigidity in post-deployed structures.

In one embodiment, a method for stiffening space stiffening material on a structure in space includes deploying a structure from a payload of a launch vehicle, wherein the structure is composed of the space stiffening material. The method also includes orienting the space stiffening material towards the ultraviolet (UV) light emanating from the sun in order to increase the strength and rigidity of the space stiffening material.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
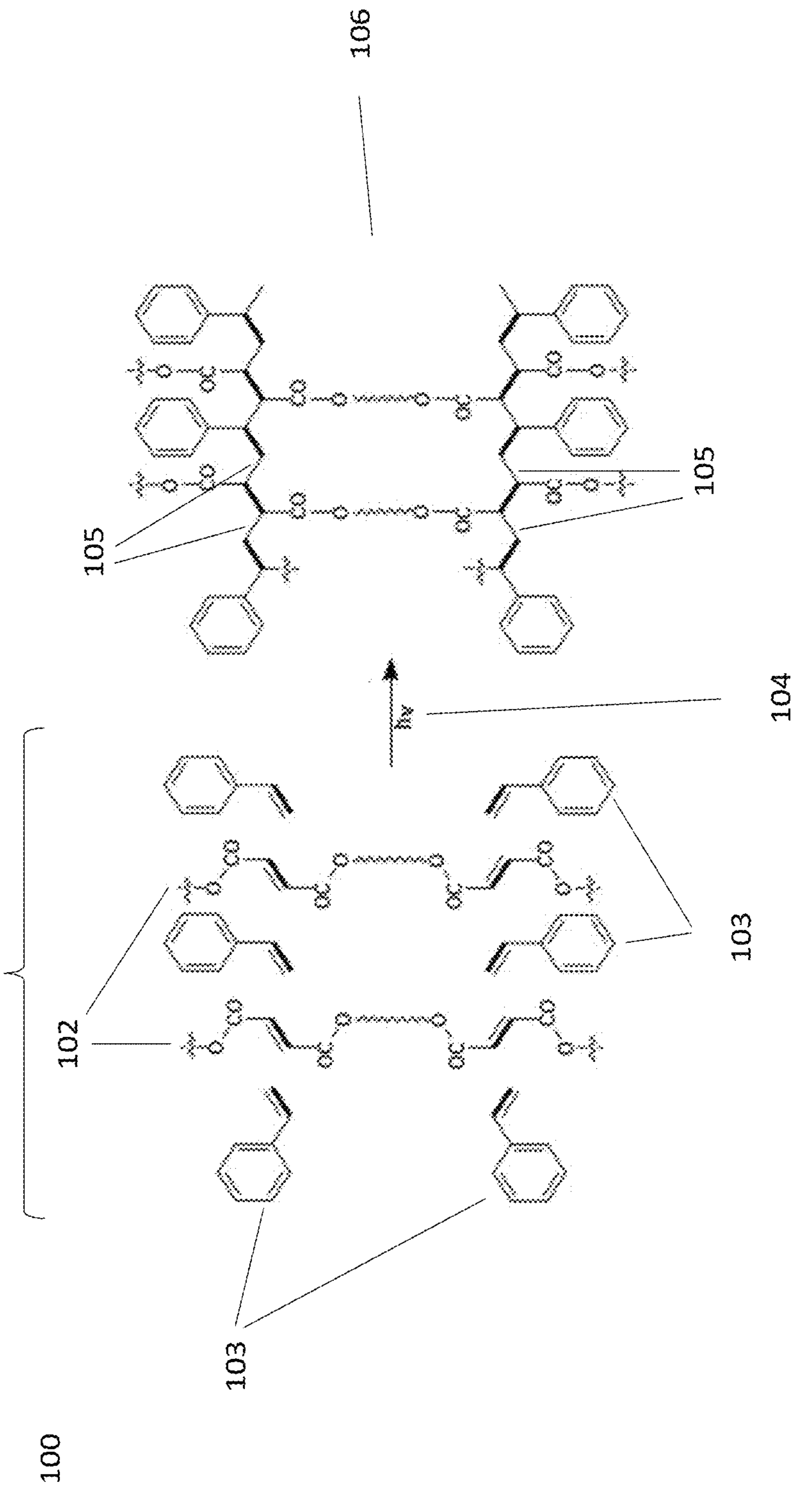
FIG. 1 is a diagram illustrating a UV initiated polymerization of monomer dissolved in a solid polymer matrix, according to an embodiment of the present invention.

There are classes of this space stiffening material (e.g., polymers and resins) that may be cured under ultraviolet (UV) illumination to become rigid. Some embodiments utilize solar UV light, which is present in near Earth space (i.e., almost 30 times more than is present on Earth's surface), to perform the stiffening of the space stiffening material. This space stiffening material is configured to increase its stiffness and the rigidity of post-deployed structures. For example, the space stiffening material, which increases its stiffness or rigidity post-deployment in space, is used, allowing the structure to be folded and stored compactly in a payload from launch to the deployment location in space prior to stiffening. This structure, which was compactly stored, can be deployed to its larger, open structure, and may undergo a chemical change to increase the rigidity of the space stiffening material when exposed to solar UV irradiation after it has been deployed. For example, a polymer system increases the structure's stiffness or rigidity under the exposure of the solar UV light.

In short, materials composed of UV sensitive polymers may undergo solar UV photoinduced polymerization through the activation of photoabsorbing chemical groups under the exposure of solar illumination in space. Structures employing these materials may open up or be opened in space, and may be controllably exposed to the solar illumination containing UV light. These materials undergo chemical reactions when exposed to solar UV light leading to further polymerization processes that increases the stiffness of the materials. This post deployment stiffening reaction, which can include polymerization (i.e., separate from any initial polymerization on Earth for material fabrication) increases the space stiffening material's intrinsic rigidity and allows the space stiffening material to retain its shape after solar irradiation. This intrinsic material stiffness leads to extrinsic rigidity of the structure composed of these materials, reducing the need for external stiffening from scaffolds, guy wires, inflation, or rotation, thus reducing cost, weight and complexity of the structure and improving structure performance.

In one embodiment, to stiffen the material in space, solar UV light already present in space (i.e., 30× more than the presence on Earth) is used. For example, instead of having an external (or internal) UV light source to stiffen the space stiffening material, the space stiffening material is controllably exposed to the sun, and the sun's UV illumination (not shielded by the ozone layer or atmosphere) triggers a chemical reaction that stiffens the material. This controlled exposure process of the material to the sun may involve active movement of the material structure towards the sun through the use of the structure's attitude control system (ACS) (e.g., thrusters or reaction wheels/rods), through the use of the induced rotation of the structure through solar illumination, or through the procession of the object in space.

These space stiffening materials can be used for inflatable habitats, which can be expanded using methods such as gas inflation or deployed internal or external struts, and this structure can then be stiffened by the UV light from the sun. The inflation mechanism would no longer be needed to retain the deployed structure shape and the expansion mechanism or gas could be redeployed for other habitats or structures. For example, gas may be used to inflate a volume contained by these space stiffening materials, and then once the material becomes stiff under solar illumination, the gas could be recaptured for inflation of other volumes. Alternatively, an internal or external structure could be used to open up the volume, which would become stiff, and then the structure could be redeployed elsewhere. These habitats or structures can be volumes for human occupied space, storage, laboratories, or other useful volumes in space. By using this technique, high positive pressure is no longer required to maintain the form of the structure through inflation, allowing the structure to retain is shape in the event of puncture or other inflation failure, as well as retaining structure if any scaffolding fails, or for use as an uninflated volume.

For solar sails, a large structure is deployed and momentum transfer is used to direct sunlight to hit the sail to move the payload along. However, constraints such as billowing of the sails needs to be minimized. These may be minimized by using struts and structures. However, if the material can be stiffer, then the efficiency of momentum transfer may be increased to the material such that the billowing is minimal and or the struts or structures can be reduced or eliminated. By increasing the stiffness of the solar sail material this billowing and flexing can be reduced, increasing the energy transfer and efficiency of the vehicle.

For a deployed space large antenna dish, the effectiveness of the antenna to send or receive information is directly impacted not only by the absolute size of the collection dish, but also by the effectiveness by the dish reflects the photons to the dish receiver. These dishes must be rigid and not suffer from warping, twisting, or billowing to prevent reductions in dish effectiveness. By making the dish material from material that stiffens after deployment into the optimal shape, dish capability is maintained. This dish could then be made from the space stiffening materials, and in their pre-stiffened state can be manufactured on Earth and then folded up for stowage in a launch vehicle. After launch and deployment the dish can be unfolded and deployed in its final shape. This shape can then be maintained by converting the material from a flexible, foldable form into a stiffer form through controlled exposure of the material to the solar UV illumination, converting the material into its final, stiff form.

In some embodiments, these materials can be employed in extraterrestrial applications beyond space orbits or transits, including on lunar, Martian, or other body locations. In these embodiments, deployment of the material and its structure can be performed on the surface of a moon, asteroid, planet or other body where sufficient solar illumination exists. These structures would still need compact packing for transport to this destination, and unfolding at their destination. For example, the lengthy lunar day (~14 days) and no atmosphere to absorb solar UV, means that the flux of UV light from the sun is equivalent whether on the moon's surface or in space. This allows for post deployment stiffening of materials on these bodies similarly to in-space stiffening. This enables lunar or Martian habitats that can be inflated with precious gasses that can be recaptured, and prevents the habitat from collapsing from a pressure loss.

In some embodiments, there may be multiple approaches to increase stiffness of the space stiffening material.

In one embodiment, solid polymer matrix with UV activatable monomers are dissolved in the solid polymer matrix. This solid polymer matrix would have structural integrity (i.e., holds/maintains it shape rather than tearing or falling apart), but still be a flexible material. This would enable fabrication of objects on Earth. The UV activatable monomers would be dispersed, dissolved, or mixed in the solid matrix. In this embodiment, post deployment the solar UV radiation would cause photochemical activation of the UV activatable monomers to form a bipolymer system with increased stiffness. The monomers would react with each other and not with the solid polymer matrix. The monomers would form long chains of oligomers within the solid polymer matrix, creating a two component material with the new photo created oligomers running throughout the solid polymer matrix, increasing the stiffness of the combined material. The solid polymer matrix and monomer material would then be a transformed to a new material resulting from the UV activated monomer units forming chemical bonds with each other within the solid polymer matrix, which then creates a new material with a higher stiffness than the initially flexible solid polymer matrix+UV activatable monomer system. The UV activatable components may be monomers, dimers, trimers, or other short chain molecules capable of forming long chains upon UV activation.

In another embodiment, the UV activatable monomers may react with the solid polymer matrix and create a new chemical structure from the polymer matrix plus monomer. This post-UV reaction material is formed from the matrix reacting with the monomers mixed within it post solar UV activation. This solar induced reaction increases the extrinsic stiffness of the new solid polymer matrix through reacting with the UV activatable monomer component. See, for example, FIG. 1, which is a diagram 100 illustrating a UV initiated polymerization of monomer dissolved in a solid polymer matrix, according to an embodiment of the present invention. Diagram 100 shows the photoinduced reaction of a styrene monomer 103 dissolved in a solid polymer matrix of a fumaric polyester material 102. Under solar illumination 104, monomer 103 is activated to react with fumaric polyester material 102. This reaction creates bonds 105 between the styrene monomer 103 and the polymer matrix forming a new material 106, which due to the increased number of bonds is stiffer than the original combination of solid polymer matrix and monomer. The UV activatable components may be monomers, dimers, trimers, or other short chain molecules capable of reacting with the solid polymer matrix upon UV activation.

Figure 2:
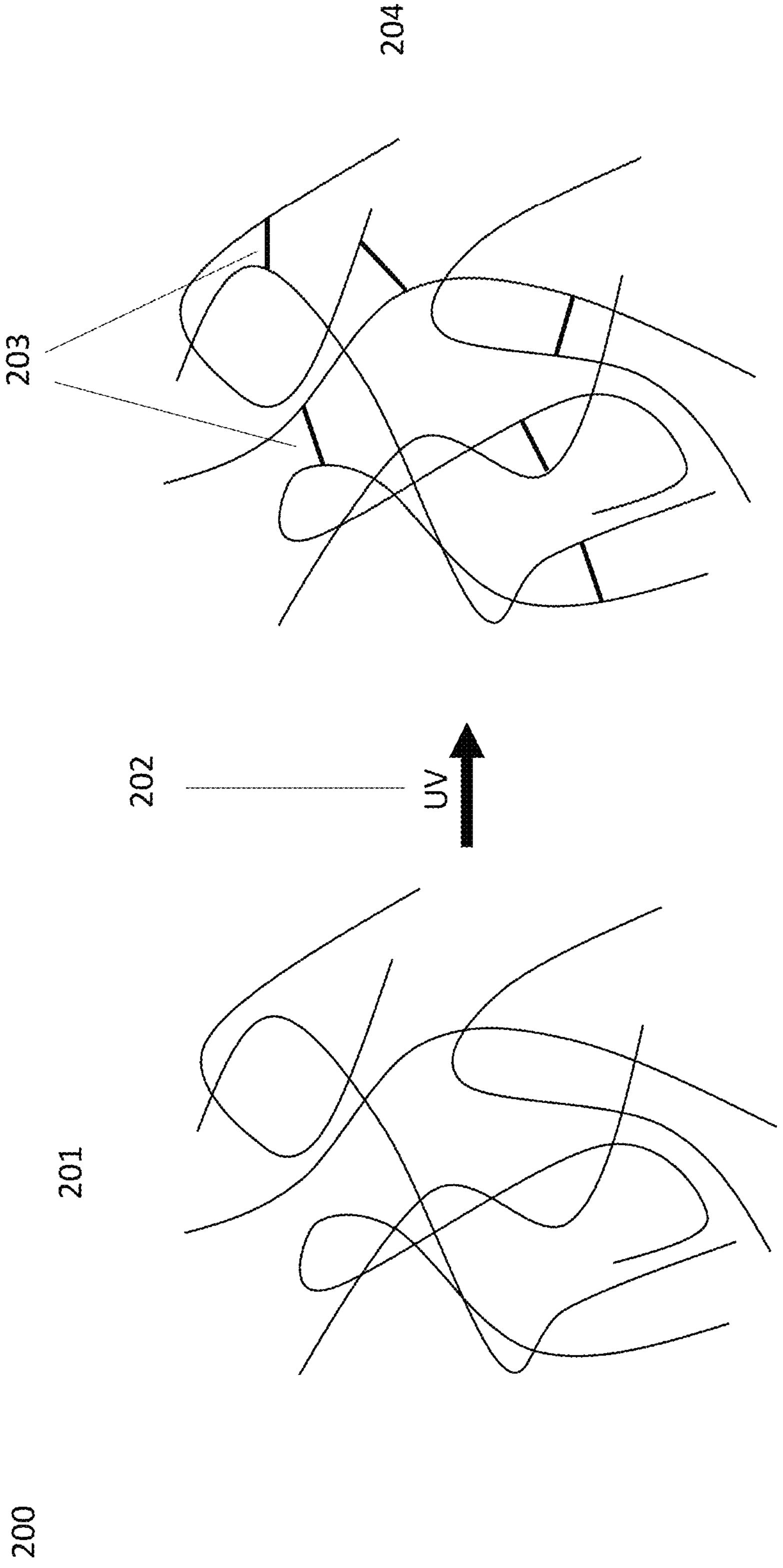
FIG. 2 is a diagram illustrating property changes in a material over extended solar UV illumination, according to an embodiment of the present invention.

In another embodiment, one or more solid polymer(s) with UV activatable crosslinking sections may be used. In this embodiment, the UV radiation activates side chains or polymer unit sections, which causes crosslinking between existing polymer chains, thereby increasing the material stiffness. See, for example, FIG. 2, which is a diagram 200 illustrating property changes in a material over extended solar UV illumination, according to an embodiment of the present invention. Diagram 200 shows this process using a polymeric material 201 composed of long strands of an oligomer. These oligomers can range in molecular weights from 5,000 to 1,000,000 grams/mole. These long strands and their inter-strand interactions form a solid material that holds its shape while remaining flexible, with the strands being able to flex by sliding past each other. Under solar UV illumination 202, the strands are activated to react with each other, and form cross link bonds 203 between adjacent oligomer strands. These bonds 203 restrict the ability of the oligomer strands to move during material flexing, resulting in a post solar UV illumination material 204 that is now less flexible and stiffer.

Figure 3:
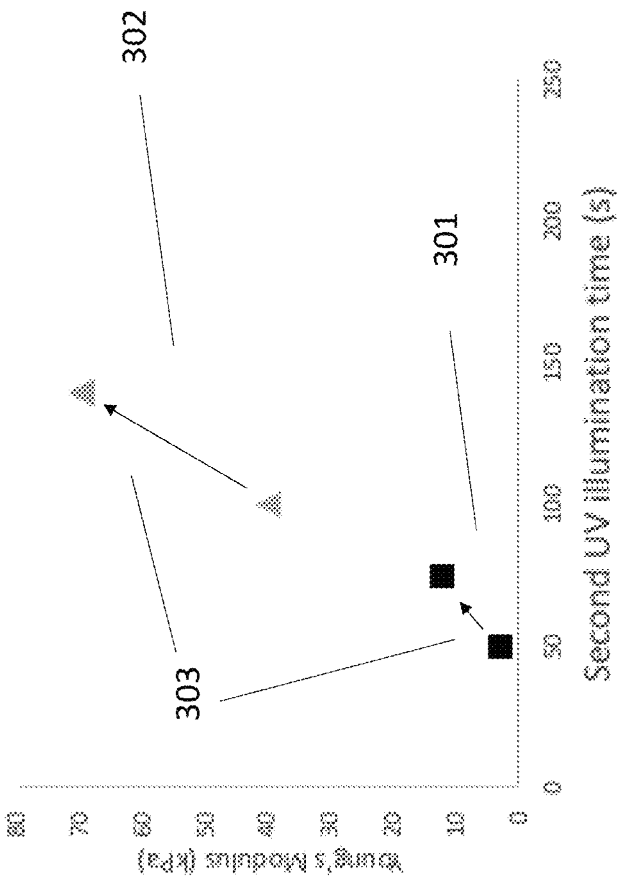
FIG. 3 is a graph illustrating peak modulus being altered with chemistry, according to an embodiment of the present invention.

In yet another embodiment, a partial UV illumination is used to achieve strength for fabrication and packaging. Using the same reactions and materials as seen in diagrams 100 and 200, these materials can be initially reacted on Earth using UV sources, such as UV lamps, to create a desired stiffness for the materials necessary for terrestrial fabrication, packing, and transport to space. Thereafter, a final solar UV exposure is used to achieve final desired properties. See, for example, FIG. 3, which is a graph 300 illustrating peak modulus being altered with UV exposure, according to an embodiment of the present invention. Graph 300 shows the stiffness of two UV activated polymers, a UV crosslinked rubber 301 and UV crosslinked polyethylene 302. Both of these materials 301 and 302 increase their Young's modulus, a measure of the tensile or compressive stiffness of a solid material under deformation, under further space based solar UV illumination 303. These materials 301 and 302 had been synthesized as solid materials through the use of terrestrial UV illumination, which was then halted, resulting in a solid, but flexible material. The solar illumination of this material post deployment increases the stiffness of the material.

Figure 4:
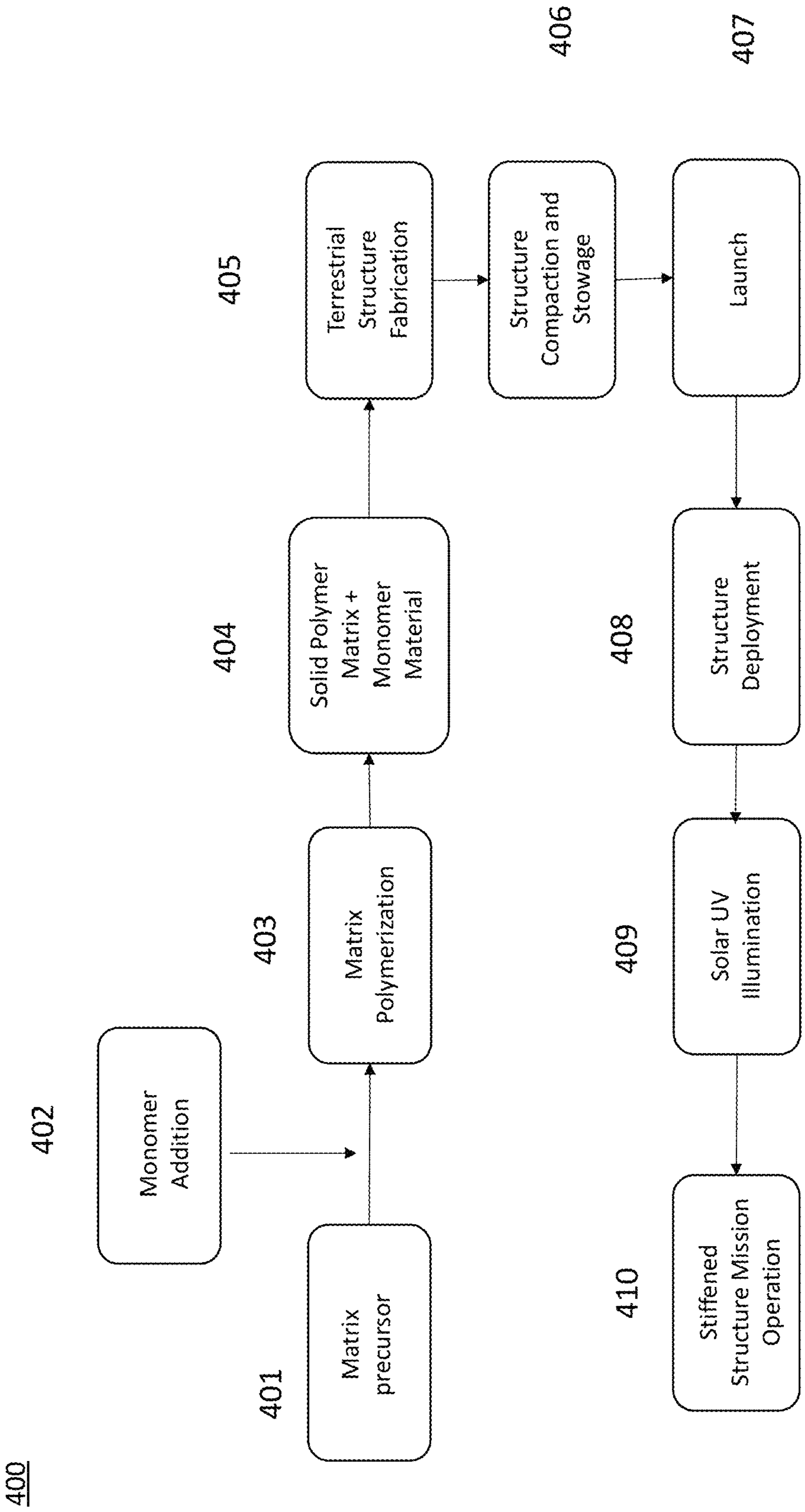
FIG. 4 is a flow diagram illustrating a method for using a self-stiffening material comprising a solid polymer matrix with a solar UV activatable monomer, according to an embodiment of the present invention.

FIG. 4 is a flow diagram illustrating a method 400 for using a self-stiffening material comprising a solid polymer matrix with a solar UV activatable monomer, according to an embodiment of the present invention. Starting at 401 with a matrix precursor for the solid polymer, a monomer is added at 402 to the solid polymer precursor. The mixture then undergoes a process at 403 to complete polymerization of the solid polymer precursor into the solid polymer matrix. At 404, this matrix polymerization creates material composed of the solid polymer matrix plus monomer. In some embodiments, this polymerization process is thermally induced, but photoactivation, chemical activation, or other polymerization processes may be used. At 405, the flexible material is fabricated into a structure. At 406, the structure is then compacted at 406 for stowage. At 407, the compacted structure is readied for launch and then transferred to its deployment destination in space. At 408, once the structure is deployed, the structure is controllably exposed to solar UV illumination to achieve stiffening at 409, and at 410, the stiffened structure is ready to perform mission operation. Controllably exposed, in some embodiments, may be defined as orientation with respect to incoming solar UV radiation at an angle to provide a predetermined dose of UV, of which the duration of the exposure may increase based on the final stiffness of the material required. This angle of exposure controls the UV radiation dose through the angle at which the solar UV impacts the surface to be stiffened, through cosine (angle of structure surface to sun direction).

Figure 5:
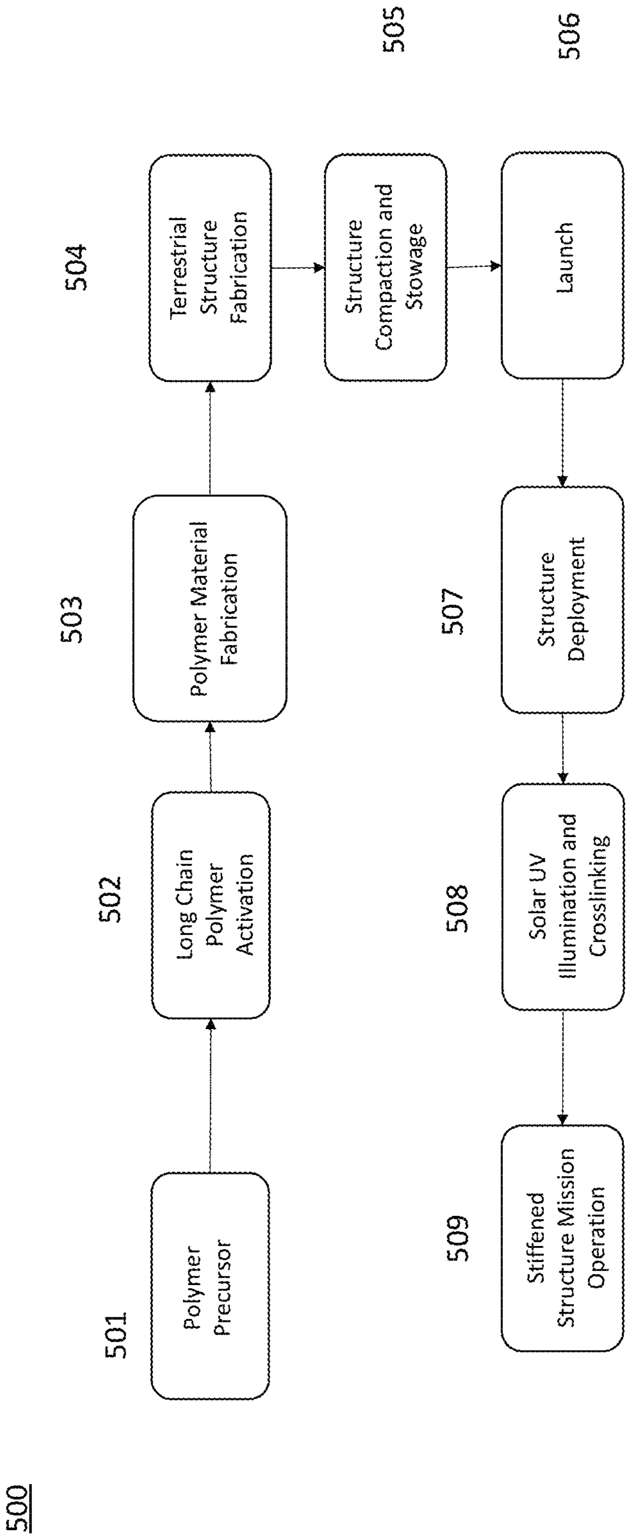
FIG. 5 is a flow diagram illustrating a method for formation of in-space stiffening material and structure using solar UV activated crosslinking of a polymer, according to an embodiment of the present invention.

FIG. 5 is a flow diagram illustrating a method 500 for formation of in-space stiffening material and structure using solar UV activated crosslinking of a polymer, according to an embodiment of the present invention. In some embodiments, method 500 begins at 501 with supplying a polymer precursor. At 502, the polymer precursor is polymerized (i.e., undergoes a long chain polymer activation) to form a solid material. This material, still flexible prior to final solar UV, can be formed using thermal or chemically activated polymerization. At 503, the polymer material undergoes a fabrication process (or transformation) to form the material for structure fabrication. From there, at 504, sheets and blocks of polymerized material is fabricated into a structure on Earth, i.e., terrestrial structure fabrication. This process can be creating sheets, struts, bars, or other shapes from the raw polymer materials, as then combining these shapes together with each other, and/or with other components to form a deployable structure. For example, the raw polymer material is extruded into sheets that are attached together onto a foldable strut network to form a structure that can fold and unfold origami-like. At 505, once the structure is formed, the structure is packed, and at 506, is readied for launch. At 507, the structure is deployed in space, and at 508, the structure or selected portions of the structure are controllably exposed to solar UV illumination to activate the polymer material to crosslinking between the individual polymer chains. After illumination and cross-linking, at 509, the structure is now stiffened to make a more rigid structure for mission operation.

Figure 6:
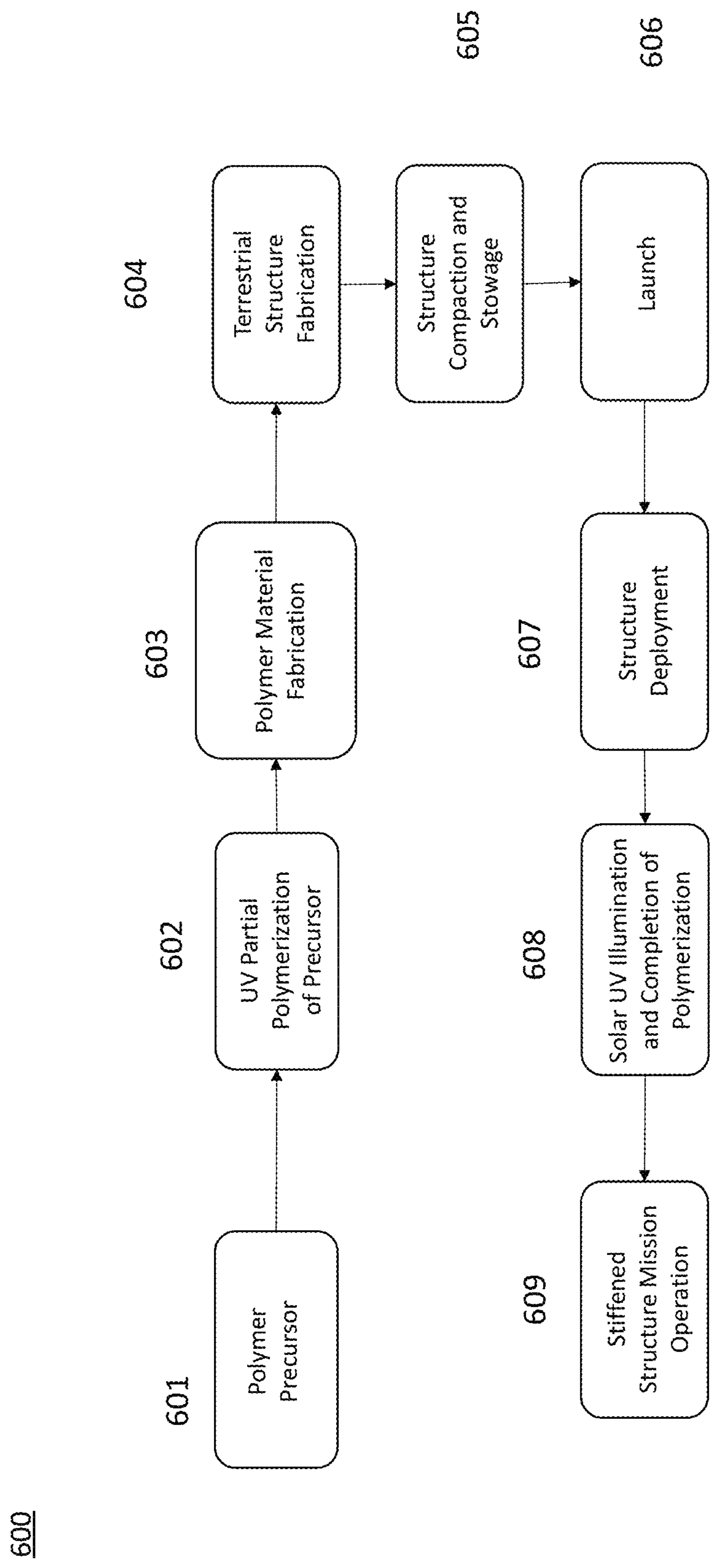
FIG. 6 is a flow diagram illustrating a method for the formation of a rigid space structure from partial terrestrial UV polymerization of the structure material, with completion of rigidization post deployment in space under solar UV illumination, according to an embodiment of the present invention.

FIG. 6 is a flow diagram illustrating a method 600 for the formation of a rigid space structure from partial terrestrial UV polymerization of the structure material, with completion of rigidization post deployment in space under solar UV illumination, according to an embodiment of the present invention. In some embodiments, method 600 begins at 601 with precursor material being introduced. At 602, the precursor material undergoes a controlled partial UV photoinduced polymerization to form a solid material. Controlled partial UV photoinduced polymerization, in some embodiments, may be defined as providing a defined dose of UV to create the desired stiffness. For example in FIG. 3 material 302 is exposed to an initial 100s of UV illumination to form a material with the requisite stiffness (as measured by the Young's Modulus of 39 kPa). At 603, the polymer material 603 is fabricated. At 604, the polymer material is still flexible for structural fabrication for folding or compaction in step 605 prior to launch at 606. After deployment in step 607, the material is then controllably exposed to solar UV illumination to complete the polymerization that was started in step 602 to form a stiff material for mission operation in step 609 of a rigid space structure. This second controlled exposure time, dose, or energy of solar UV is determined from previous measures of the material's changes under UV illumination. For example, in FIG. 3, material 302 is exposed to an additional 50s of UV illumination to raise the Young's Modulus to 69 kPa.

Figure 7:
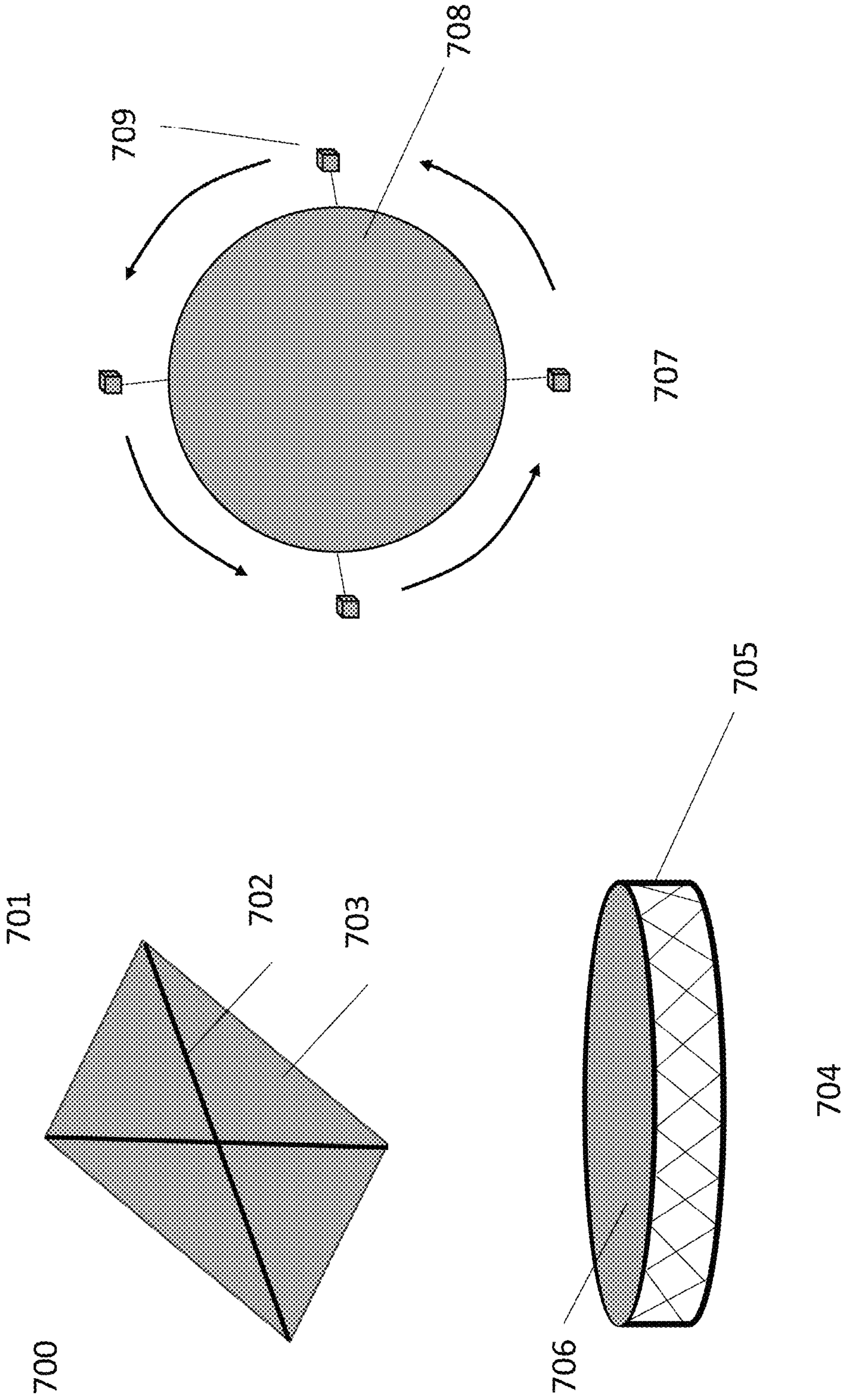
FIG. 7 is a diagram illustrating large space structures, according to an embodiment of the present invention.

FIG. 7 is a diagram illustrating large space structures 700, according to an embodiment of the present invention. In some embodiments, large space structures, such as solar sails 701 with rigid struts 702, hold open the gross shape of solar sail 701. However, material 703 is still flexible due to the need to have been folded up to fit in the much smaller launch payload fairing, and as such, still billows or ripples even in space, reducing momentum transfer from the sail to the payload, reducing efficiency. If rigid struts 702 and material 703 were to be replaced with a material that stiffens under solar UV illumination, then the mass of structure 701 would be reduced, while also reducing billowing and rippling of material 703 and improving momentum transfer to the payload, thereby increasing the efficiency of solar sail 701.

In another embodiment, large space structures, such as space antenna structure 704, may conventionally be deployed using barrel struts 705 to open up antenna surface 706. However, by replacing material (or antenna surface) 706 with a space stiffening material that becomes rigid under solar UV illumination, the mass of antenna structure 706 may be reduced by eliminating the need for the barrel structure, and may reduce antenna surface 706 undulation, thereby improving antenna function.

In another embodiment, structure 707 is held open through rotation of material 708 through propulsion of units 709 generating a centrifugal force that pulls open material 708 and taut through continued rotation. By using solar UV stiffened material, the continued rotation is no longer needed to keep material 708 taut, and allows for the elimination of rotational elements 709. This removal of the necessity for rotation allows for easier maneuvering and orientation of structure 707 as there would not be rotational inertia to counter.

In short, these embodiments use different techniques to start with a solid (but flexible) material, and transform the solid into a more rigid material. Rigidity is an extrinsic, external property of the structure the material comprises. Increasing the intrinsic stiffness of the material results in a structure that is extrinsically rigid. Altering the material properties through solar illumination after the structure is deployed results in a more rigid structure that needs less structural support, and creates a more durable, stiff, lighter, and reliable.

Figure 8:
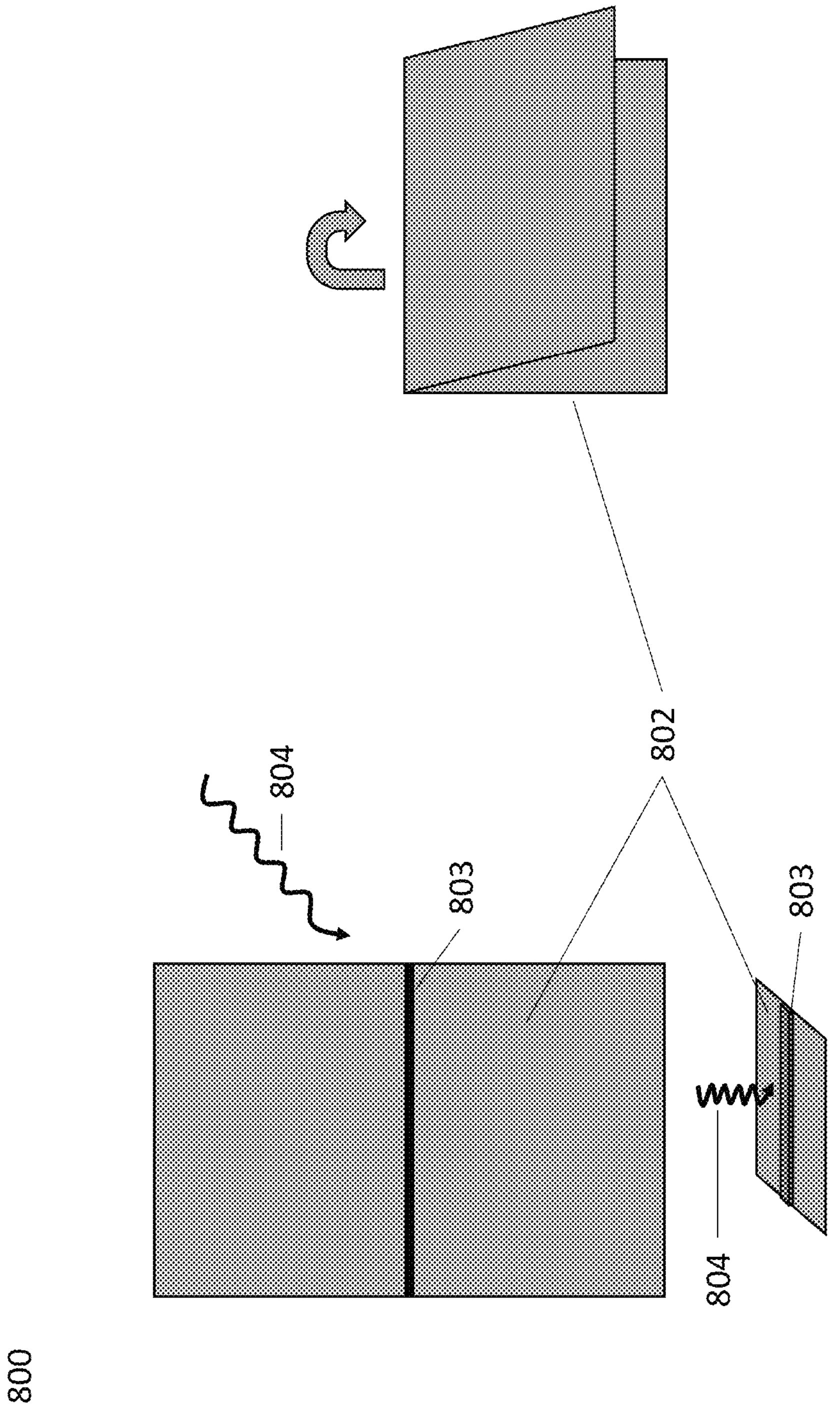
FIG. 8 is a diagram illustrating a structure, according to an embodiment of the present invention.

In addition to creating uniform, stiff materials for space structures, this method can also create structures with joints or intended points of flexion through the controlled and selective illumination of the solar UV stiffened material. See, for example, FIG. 8, which is a diagram illustrating a structure 800, according to an embodiment of the present invention. In some embodiments, structure 800 is fabricated with stiffenable material 802 having opaque or UV blocking/absorbing material 803 overlying a part of material 802. Under solar UV illumination 804, all sections of stiffenable material 802 become stiff with the exception for areas underneath UV blocking/absorbing material 803. This will retain the initial flexibility of material 802. As material 803 is also flexible, this creates a joint or hinge in structure 800 post illumination, allowing for structure 800 to bend at that location, and only that location. This creation of flex points, joints, or hinges vastly increases the shape and structures possible using this method, and removes the need for a frame or mechanical hinge at those locations, reducing complexity and mass of the final structure.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for stiffening space stiffening material on a rigid space structure in space, comprising:

deploying a prefabricated structure from a payload of a vehicle, wherein the prefabricated structure is composed of the space stiffening material; and controllably orienting the space stiffening material towards the ultraviolet (UV) light emanating from the sun in order to increase the strength and rigidity of the space stiffening material, forming the rigid space structure.

2. The method of claim 1, further comprising:

adding a solar UV activable monomer to a solid matrix precursor to create a mixture comprising of the solid matrix precursor and the matrix solar UV activable monomer.

3. The method of claim 1, further comprising:

fabricating the solid but flexible material into the space stiffening material; and fabricating sheets and blocks of the space stiffening material into the rigid space structure on Earth prior to launching into space.

4. The method of claim 1, wherein the orienting the space stiffening material and performing controlled exposure of the space stiffening material to the UV light emanating from the sun to transform the space stiffening material to the rigid space structure.

5. The method of claim 4, wherein the performing the controlled exposure of the space stiffening material to solar UV light comprises performing activation of the UV activatable monomers in the solid polymer matrix to form long chain polymer chains in the space stiffening material to transform the space stiffening material to the rigid space structure.

6. The method of claim 1, further comprising:

polymerizing a polymer precursor to form a solid but flexible material prior to UV exposure, wherein the polymer precursor comprises a plurality of UV activatable side chains or chemical units to connect adjacent UV activable side chains or chemical units together.

7. The method of claim 1, further comprising:

performing a controlled solar UV photoinduced side chain polymerization of the space stiffening material, wherein the plurality of UV activatable side chains react together in the space stiffening material to transform the space stiffening material to the rigid space structure.

8. The method of claim 7, wherein the performing the controllably exposure of the space stiffening material comprises performing cross-linking between each of the plurality of individual polymer chains in the space stiffening material to transform the space stiffening material to the rigid space structure.

9. The method of claim 1, further comprising:

creating, by using a UV activable monomer, the space stiffening material, wherein the UV activable monomer being exposed to a controlled amount of UV illumination, creates a flexible partially polymerized material.

10. The method of claim 1, further comprising:

fabricating a partially UV polymerized material into the space stiffening material; and fabricating sheets and blocks of the space stiffening material into the prefabricated structure on Earth prior to launching into space.

11. The method of claim 10, further comprising:

orienting the space stiffening material, and performing controlled exposure of the space stiffening material, to the UV light emanating from the sun to complete polymerization of the space stiffening material to the rigid space structure.

12. A method for stiffening space stiffening material on a rigid space structure in space, comprising:

deploying a prefabricated structure from a payload of a vehicle, wherein the prefabricated structure is composed of the space stiffening material; and orienting the space stiffening material towards the ultraviolet (UV) light emanating from the sun in order to increase the strength and rigidity of the space stiffening material, forming the rigid space structure; and performing a controlled exposure of the space stiffening material to solar UV light, wherein the controlled exposure comprising performing activation of the UV activatable monomers in the solid polymer matrix to form long chain polymer chains in the space stiffening material to transform the space stiffening material to the rigid space structure.

13. The method of claim 12, further comprising:

adding a solar UV activable monomer to a solid matrix precursor to create a mixture comprising of the solid matrix precursor and the matrix solar UV activable monomer.

14. The method of claim 12, further comprising:

fabricating the solid but flexible material into the space stiffening material; and fabricating sheets and blocks of the space stiffening material into the rigid space structure on Earth prior to launching into space.

15. The method of claim 12, wherein the orienting the space stiffening material and performing controlled exposure of the space stiffening material to the UV light emanating from the sun to transform the space stiffening material to the rigid space structure.

16. The method of claim 12, further comprising:

polymerizing a polymer precursor to form a solid but flexible material prior to UV exposure, wherein the polymer precursor comprises a plurality of UV activatable side chains or chemical units to connect adjacent UV activable side chains or chemical units together.

17. The method of claim 12, further comprising:

performing a controlled solar UV photoinduced side chain polymerization of the space stiffening material, wherein the plurality of UV activatable side chains react together in the space stiffening material to transform the space stiffening material to the rigid space structure.

18. The method of claim 17, wherein the performing the controllably exposure of the space stiffening material comprises performing cross-linking between each of the plurality of individual polymer chains in the space stiffening material to transform the space stiffening material to the rigid space structure.

19. The method of claim 12, further comprising:

creating, by using a UV activable monomer, the space stiffening material, wherein the UV activable monomer being exposed to a controlled amount of UV illumination, creates a flexible partially polymerized material.

20. The method of claim 12, further comprising:

fabricating a partially UV polymerized material into the space stiffening material; and fabricating sheets and blocks of the space stiffening material into the structure on Earth prior to launching into space.

21. The method of claim 20, further comprising:

orienting the space stiffening material, and performing controlled exposure of the space stiffening material, to the UV light emanating from the sun to complete polymerization of the space stiffening material to the rigid space structure.

* * * * *